United States Patent [19]
Ferry

[11] Patent Number: 5,992,798
[45] Date of Patent: Nov. 30, 1999

[54] SEAT

[75] Inventor: David Ferry, Warnham, United Kingdom

[73] Assignee: Reynard Aviation Limited, United Kingdom

[21] Appl. No.: 09/053,042

[22] Filed: Apr. 1, 1998

[30] Foreign Application Priority Data

Apr. 2, 1997 [GB] United Kingdom .................. 9706650

[51] Int. Cl.$^6$ ........................................ B60N 2/24
[52] U.S. Cl. ................................ 244/118.6; 244/122 R; 297/354.13; 105/316
[58] Field of Search ................ 244/122 R, 118.5, 244/118.6; 105/314, 315, 316, 321; 297/344.19, 354.12, 354.13, 118; 5/9.1, 18.1, 37.1, 41

[56] References Cited

U.S. PATENT DOCUMENTS

| | | | |
|---|---|---|---|
| 1,767,890 | 6/1930 | Konzelman | 105/316 |
| 5,425,516 | 6/1995 | Daines | 244/118.6 |
| 5,740,989 | 4/1998 | Ddaines | 244/118.6 |
| 5,788,183 | 8/1998 | Marechal | 244/118.6 |
| 5,857,745 | 1/1999 | Matsumiya | 244/118.6 |
| 5,940,440 | 5/1999 | Alberda et al. | 297/354.13 |

*Primary Examiner*—Galen L. Barefoot
*Attorney, Agent, or Firm*—Nixon & Vanderhye P.C.

[57] ABSTRACT

The present invention provides a seat for a passenger vehicle, particularly an aircraft, which seat comprises a first fixed part for supporting the seat adjacent a floor of a vehicle; a second movable part comprising a seat pan component, a back-rest component and a leg-rest component; guiding means between the first fixed and second movable part for guiding movement of the movable parts relative to the fixed part between an upright position and a fully reclined position, such that as the movable part is moved towards the fully reclined position, said back-rest component is lowered translationally towards the floor; reclining means for reclining the back-rest component from an upright orientation to a fully reclined orientation as the movable portion is moved from the upright to the fully reclined positions; the arrangement being such that as the movable part is moved between the upright and fully reclined positions, the locking drive means is controlled such that the leg-rest component remains in contact with the vehicle floor, and the back-rest, seat pan and leg-rest components are oriented to define successive comfortable positions for a passenger.

15 Claims, 13 Drawing Sheets

SEAT

FIELD OF THE INVENTION

The present invention relates to a seat, and has particular reference to a passenger seat for use on a passenger vehicle, especially an aircraft. The present invention also embraces a passenger vehicle such, for example, as an aircraft, that is equipped with one or more seats in accordance with the invention.

BACKGROUND TO THE INVENTION

Passenger seats for use on aircraft, sea-going passenger ferries and luxury coaches comprise a seat pan and a reclinable back-rest. Generally, the seat pan is fixedly secured to a support frame that is anchored to a floor of the vehicle. A disadvantage of this arrangement is that as the back-rest is reclined, it impinges on the space of a passenger using a seat positioned behind the one being reclined. Some passenger seats, particularly those which are used in the business-class and first class sections of passenger aircraft, additionally include a leg-rest that can be moved between a raised position and a lowered position. Often, the back-rest reclining and leg-rest moving mechanisms are linked, so that as the back-rest is reclined from an upright position to a reclined position, the leg-rest is moved towards the raised position. Whilst the additional comfort provided by the leg-rest is recognised, a disadvantage with this arrangement is that when the leg-rest is raised, the space (or "foot well") adjacent the floor under the back-rest and seat pan of a seat in front of the one being reclined cannot be properly utilised.

At the time of writing, there is a trend towards providing passenger seats in which the back-rest and leg-rest can be manoeuvred to form a substantially flat surface with the seat pan on which a passenger can lie down for sleeping. In some cases, where the seat pan is fixedly secured to a support frame as previously mentioned, this is simply achieved by allowing the back-rest and leg-rest to be respectively reclined and raised further than was the case previously, so as to be substantially coplanar with the seat pan. Of course, this exacerbates the problems discussed above associated with the use of reclining seat-backs and lifting leg-rests, and requires the pitch between adjacent rows of seats to be substantially increased.

WO-A-96/18537 of British Airways Plc discloses a passenger seat for an aircraft that comprises a housing that can be fixedly secured to a cabin floor of the aircraft, and a movable portion comprising a back-rest, a seat pan and a leg-rest. The seat pan is hinged to the back-rest and is supported at a point remote from the hinge by a trolley, which trolley is adapted for translational movement on the cabin floor between a retracted position and an extended position relative to the housing. A motorised screw-drive is fitted between the trolley and the housing for driving the trolley between these two positions. Two spaced arms that are attached to opposing sides of the seat pan each comprise a guide member that is accommodated within a track formed in a respective side wall of the housing. The track is shaped, so that as the trolley is moved between the retracted and extended positions, the part of the seat pan adjacent the hinge to the back-rest is raised or lowered, so that the seat pan is pivoted about its mounting on the trolley through pre-selected orientations. Each side wall of the housing further comprises an additional track that accommodates a second guide member, which guide member is fixedly secured to a respective side of the back-rest. The additional tracks are configured so that as the trolley is moved between the retracted and extended positions, and the seat pan is rocked about its mounting on the trolley, the back-rest is progressively reclined between an upright position and a fully reclined position, with the recline angle of the back-rest portion at any given position of the trolley being defined by the position of the hinge between the seat pan and back-rest and the position of the second guide members in their respective additional tracks.

The passenger seat of WO-A-96/18537 is arranged so that as the back-rest is reclined the back-rest remains within the housing, so that it does not interfere with the space of a passenger using a seat behind the one being reclined. In the fully reclined position, the seat pan and back-rest are oriented such that they are substantially coplanar with one another to form a flat surface for a passenger to sleep on. The passenger seat of WO-A-96/18537 further comprises a leg-rest that is mounted pivotably on the trolley adjacent the seat pan mounting. A second motorised screw-drive is provided for moving the leg-rest between a lowered position and a raised position in which the leg-rest is substantially coplanar with the seat pan and back-rest to extend the sleeping surface.

The passenger seat of WO-A-96/18537, whilst it solves the problem of the back-rest being reclined into a space of another passenger, has a number of serious disadvantages. First of all, the trolley used for supporting the seat pan, and for driving the movable part of the seat between the retracted and extracted positions is a complex, and thus expensive component to manufacture and adds substantially to the weight of the seat. Secondly, as the seat pan is supported on the trolley remote from the hinge to the back-rest, the height of the seat pan where it is mounted on the trolley above the cabin floor is fixed. Thus, a foot well provided in the rear of a seat in front of the one being reclined cannot be utilised fully when the seat is in the fully reclined position, with the leg-rest raised.

A further disadvantage of the seat of WO-A-96/18537 is that the screw-drive mechanism used for driving the trolley into and out of the housing is located within the housing, beneath the seat pan and back-rest, in juxtaposition with the cabin floor. The screw-drive mechanism thus impinges on the space towards the bottom of the housing which is available for use as a foot well, and moreover is positioned where it is likely to collect dust, dirt and other detritus which may, in time, be injurious to proper operation of the screw-drive mechanism.

OBJECTS OF THE INVENTION

Accordingly, it is an object of the present invention to provide an improved seat for a passenger vehicle, in particular an aircraft.

Another object of the present invention is to provide a passenger seat having a back-rest, seat pan and leg-rest, which seat can be manoeuvred between an upright position and a fully reclined position in which the seat pan, back-rest and leg-rest define a substantially flat surface for sleeping on, which seat does not impinge on the space of a passenger using a seat behind the one being reclined, and which enables the pitch between neighbouring rows of seats to be minimised.

Yet another object of the present invention is to provide a passenger seat in which, in the fully reclined position, the leg-rest is positioned adjacent a floor of the vehicle, so as to make best use of a foot well provided in a seat in front of the one that is fully reclined.

Yet another object of the invention is to provide a passenger seat that is light-weight, and is of uncomplicated construction.

Yet another object of the present invention is to provide a passenger seat in which the foot well space defined by the seat is maximised. Finally, it is yet another object of the invention to provide a seat having a driving mechanism for driving the seat between upright and fully reclined positions, which driving mechanism is protected from dirt, detritus and the like.

SUMMARY OF THE INVENTION

According to one aspect of the present invention therefore there is provided a seat for a passenger vehicle, particularly an aircraft, which seat comprises a first fixed part for supporting the seat adjacent a floor of a vehicle; a second movable part comprising a seat pan component, a back-rest component and a leg-rest component; guiding means between the first fixed and second movable part for guiding movement of the movable parts relative to the fixed part between an upright position and a fully reclined position, such that as the movable part is moved towards the fully reclined position, said back-rest component is lowered translationally towards the floor; reclining means for reclining the back-rest component from an upright orientation to a fully reclined orientation as the movable portion is moved from the upright to the fully reclined positions; first pivot means for allowing the leg-rest component to be pivoted relative to the seat pan component between a raised position and a lowered position; and second pivot means for allowing the seat pan component to be pivoted relative to the back-rest component; characterised in that a locking drive means is associated with one of said first and second pivot means for pivoting relative to each other the components pivoted on said one pivot means, free pivoting is allowed of the components pivoted about the other pivot means and controlling means are provided for controlling the operation of the locking drive means according to the position of the movable part between the upright and the fully reclined positions; the arrangement being such that as the movable part is moved between the upright and fully reclined positions, the locking drive means is controlled such that the leg-rest component remains in contact with the vehicle floor.

Preferably the locking drive means acts between the seat pan and leg-rest components, and the leg-rest components and seat pan are capable of freely pivoting relative to each other. It will be appreciated that as the movable part is moved progressively from the upright position to the fully reclined position, the guiding means guide the movement such that the back-rest component is lowered translationally towards the floor of the vehicle. As the back-rest component is lowered towards the floor, the recline angle of the back-rest component is controlled by the reclining means. As the seat pan component is capable of pivoting freely with respect to the back-rest component, it will be understood that the effect of lowering the back-rest component translationally towards the floor of the vehicle will be to cause the seat pan component to tilt rearwardly, that is to reduce the angle subtended by the back-rest and seat pan components to the side of the movable part which is intended to be sat on by a passenger, that is the upper side. However, the orientation of the seat pan component will also be affected by the angle between the leg-rest and seat pan components which can be adjusted by the locking drive means.

In accordance with the present invention, the seat is operated, so that the leg-rest component remains in contact with the vehicle floor. As the angle subtended by the leg-rest and seat pan components to the under side of the movable part is increased by operating the locking drive means, so as to move the leg-rest component towards the raised position, the seat pan component will therefore tend to tilt forwardly, that is to increase the angle subtended by the back-rest and seat pan components to the upper side of the movable part. The actual orientation of the seat pan component is thus defined by the position of the back-rest component between the upright and fully reclined positions, and by the position of the leg-rest component between the raised and lowered positions.

Preferably therefore the guide means, reclining means and locking drive means will be constructed and operated, so that as the movable part is moved between the upright and fully reclined positions, the back-rest, seat pan and leg-rest components are moved through one or more predetermined, ergonomically comfortable positions in succession. Intermediate these pre-selected positions, the construction and control of the guiding means, reclining means and controlling means can be calculated by interpolation.

In some embodiments, the back-rest, leg-rest and seat pan components will define a substantially flat surface for a passenger to sleep on, when the movable part is disposed in the fully reclined position.

Said leg-rest component may be equipped with a linear bearing such, for example, as rollers or casters, for facilitating movement of the leg-rest component over the floor of the vehicle.

In a particularly preferred aspect of the present invention, the locking driving means acts between the seat pan and leg-rest components, so that the leg-rest component can be used to support at least part of the weight of the movable part of the seat (and passenger when the seat is in use) on the floor of the vehicle. It will be appreciated that a substantial part of the weight of the movable part and passenger that is supported by the back-rest and seat pan components will be transmitted to the leg-rest component through the locking drive means. At each position of the movable part between the upright and fully reclined positions, the locking drive means serves to hold the seat pan and leg-rest components in fixed relation to one another. As the leg-rest component is supported on the floor of the vehicle, the seat pan component is thus unable to move rotationally or translationally, thus preventing movement of the back-rest component. The combination of the locking driving means between the seat pan and leg-rest components, and the leg-rest component being held in contact with the vehicle floor, thus serves to hold the movable part of the seat in the selected position.

It is envisaged that the locking drive means may comprise a screw-drive mechanism.

It is also envisaged that the leg-rest component will usually be pivoted directly to the seat pan component, and the seat pan component will be pivoted directly onto the back-rest component.

Usually, the seat accordingly to the present invention will further comprise selectively operable driving means for driving the movable part progressively between the upright and fully reclined positions.

Said guiding means will preferably comprise at least one elongate track that is provided on the fixed part of the seat, and a track following member provided on the back-rest, which track following member engages the track for guiding the movable part between the upright and fully reclined positions.

Preferably, the back-rest component will be equipped with a second track following member that also engages the track, and is spaced from the first-mentioned track member along the length of the track, and the track itself may be configured, so that at each position of the movable part between the upright and fully reclined positions, the back-rest component will be located relative to the track at two spaced positions, thus defining the recline angle of the back-rest component.

Said fixed part will preferably comprise two tracks positioned on opposing sides of the movable part, and the back-rest component will be equipped with two spaced guide following members to each side, so that the two guide following members to each side engage with the respective track as previously described. Said guide following members may be rollers or other linear bearings.

In some embodiments, at least one, and preferably both of the tracks are fitted with a rack, and one of the first or second guide following members includes a pinion that engages with the rack. Preferably, said selectively operable driving means comprises a locking drive mechanism that is arranged for driving the pinion, so as cause or allow movement of the movable part of the seat between the upright and fully reclined positions. Said locking drive mechanism may comprise a selectively operable motor, which motor is preferably mounted on the back or underside of the back-rest component. Said motor may be arranged to drive an axle that extends across the back-rest component between the two sides of the movable part, and each end of the axle may carry a pinion that engages in a respective rack. Said racks may be manufactured from steel, aluminium or a suitable, high-strength plastics or composite material that can be shaped to follow the pre-determined configuration of the track.

The mounting of the motor on the back of the back-rest component away from the floor is advantageous, because the motor is protected from dust, dirt and detritus. Moveover, the motor mounted on the back-rest component in accordance with the present invention does not occupy space towards the bottom of the seat, thereby allowing more room for a foot-well.

Said fixed part may comprise a shaped housing having a back-wall and two opposing side walls. Said tracks may be formed in or carried by the said side walls of the housing.

It is envisaged that said controlling means may comprise detecting means for detecting the position of the movable part between the upright and fully reclined positions, a memory for storing the desired position of the locking driving means for each position of the movable part, and a microprocessor for controlling operation of the locking driving means in response to input from the detecting means and the memory.

Said controlling means may be adapted to operate the driving means and the locking driving means at constant or varying speeds independently of each other. In a preferred embodiment the driving means is operated at a constant speed, and the locking driving means at varying speeds.

Following is a description by way of example only with reference to the accompanying drawings of methods of carrying the present invention into effect.

DETAILED DESCRIPTION OF THE DRAWINGS

Figure 1:
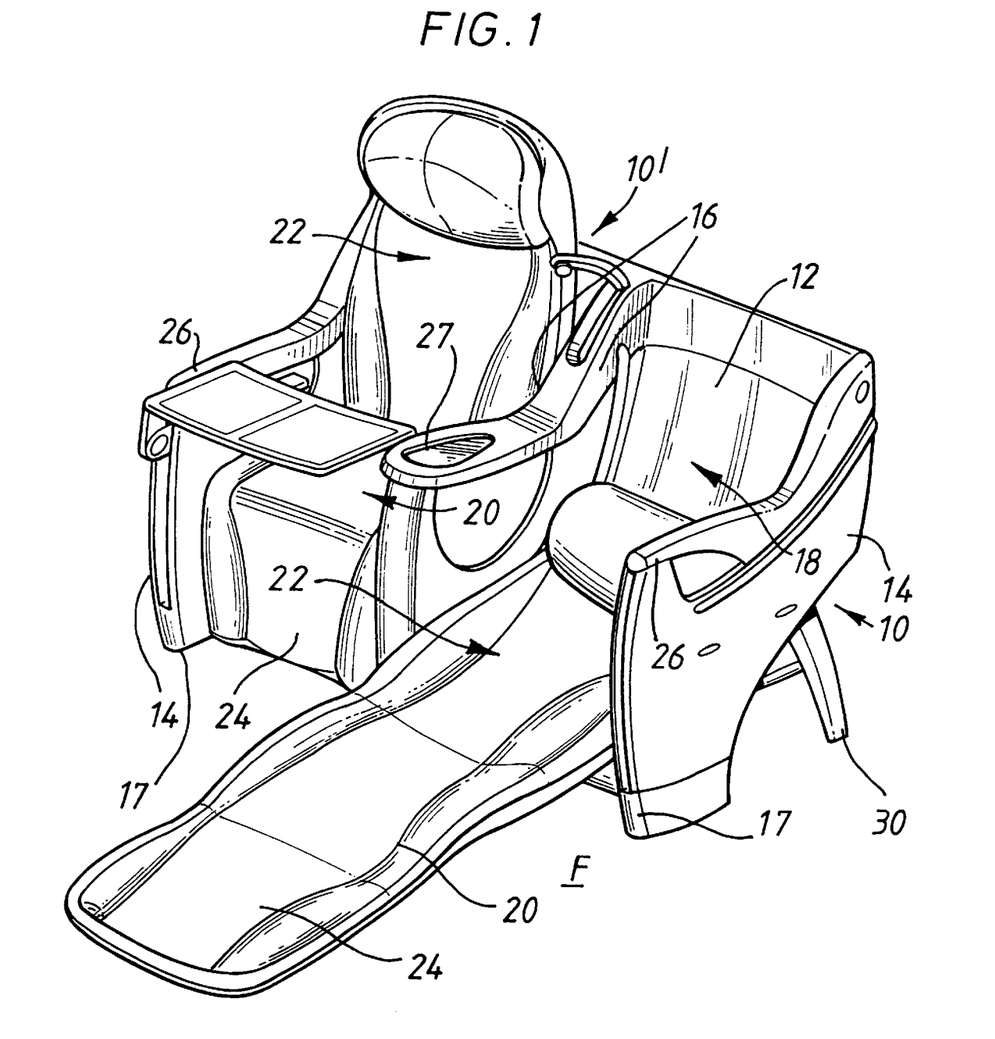
FIG. 1 is an isometric front view from above and to one side of a seat unit comprising two passenger seats in accordance with the invention.
Figure 2:
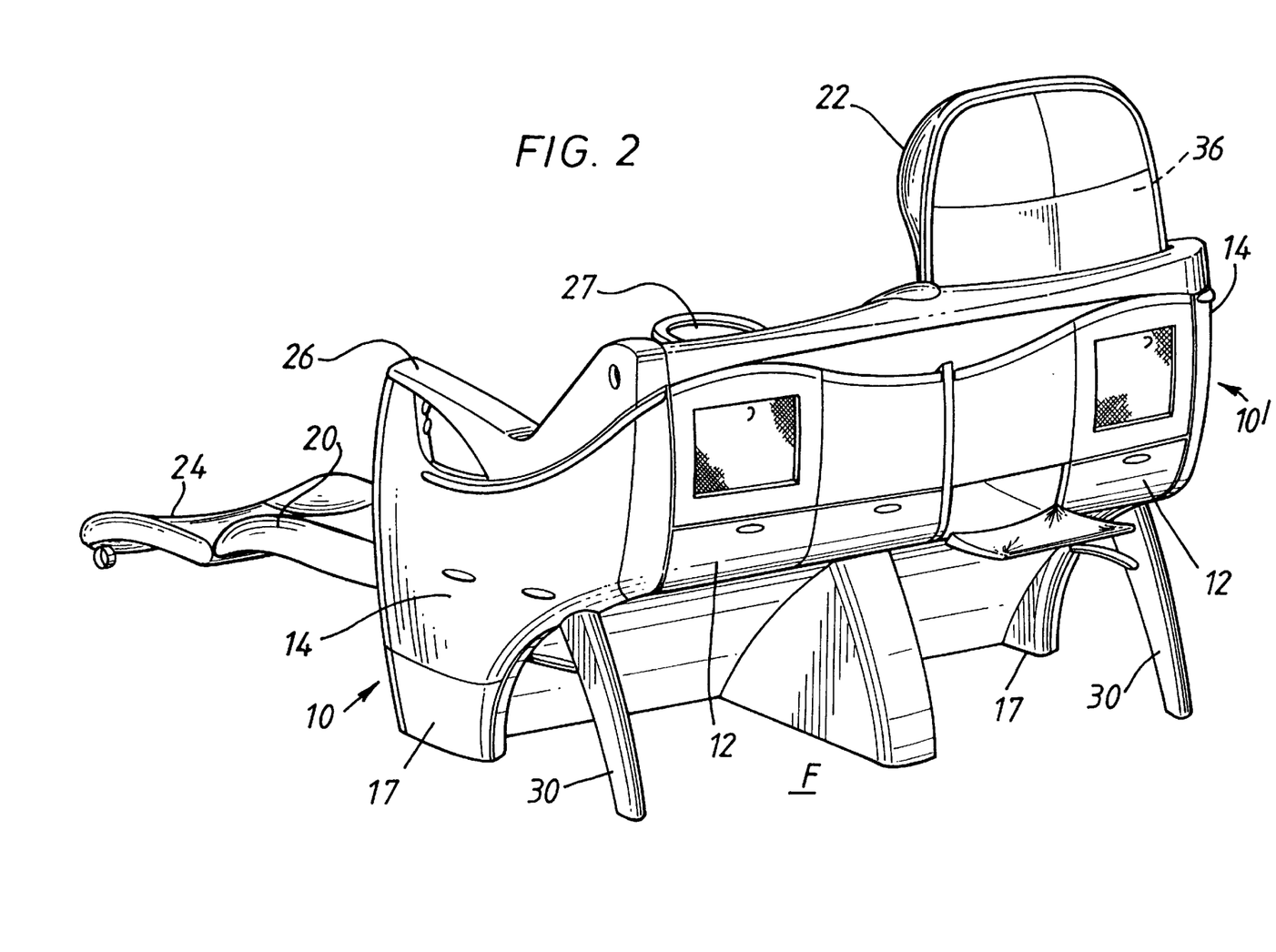
FIG. 2 is an isometric rear view from above and to the one side of the seat unit of FIG. 1.
Figure 3:
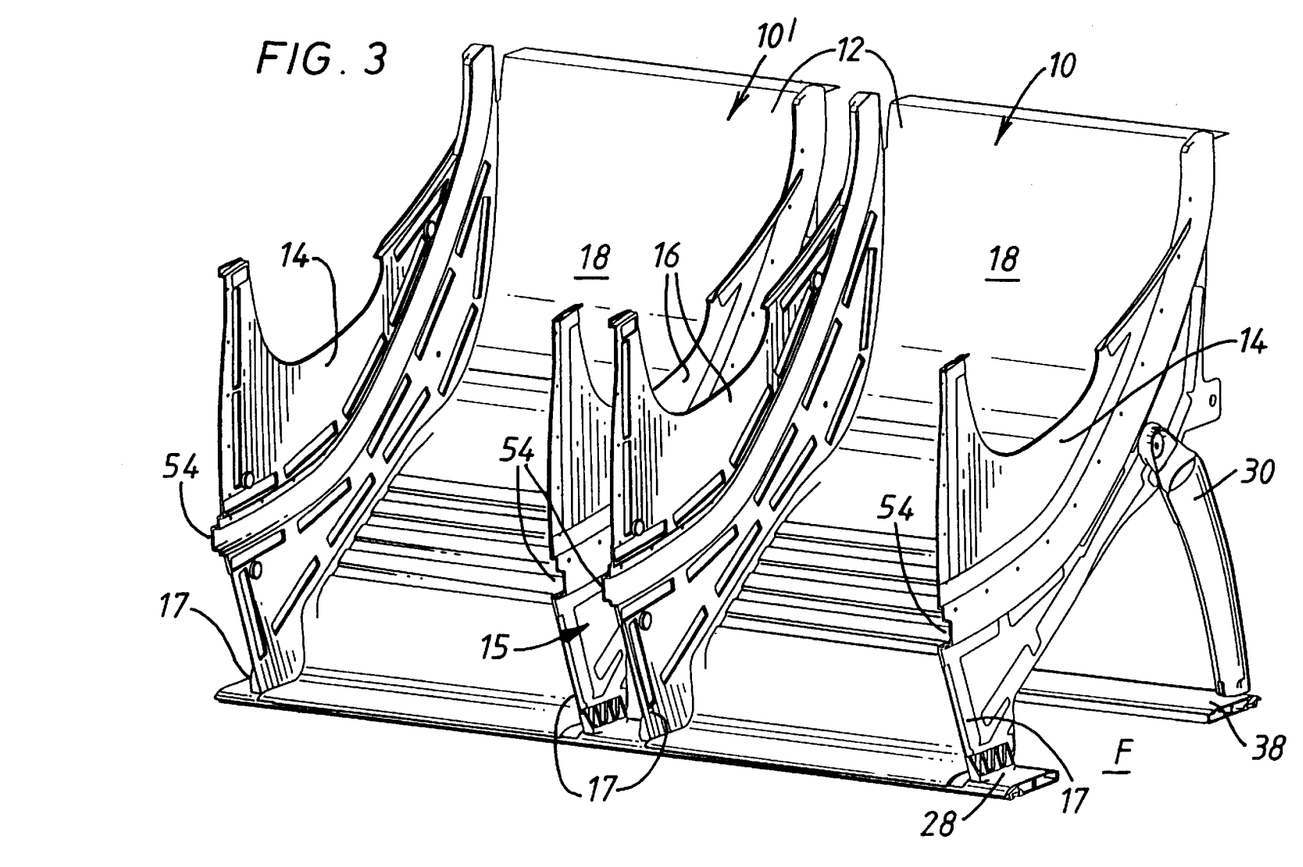
FIG. 3 is an isometric view of the housing for the seat unit of FIGS. 1 and 2.

A seat unit as illustrated in FIGS. 1 and 2 comprises two adjacent seat housings (10,10') as shown in FIG. 3 that can be fixedly secured to a floor (F) of a vehicle such, for example, as a passenger aircraft. Each housing (10,10') accommodates a movable part that comprises a seat pan (20), a back-rest (22) and a leg-rest (24).

Said housing (10) comprises spaced, upstanding inner and outer side walls (14,16) and a shaped rear wall (12). Said rear wall (12) and side walls (14,16) may be manufactured from any suitable, light-weight structural material, but preferably they comprise an aluminium and pressure moulded composite skeleton frame (15) and a cladding moulded from a plastics or glass/resin composite material. The side walls (14,16) and rear wall (12) define a recess (18) that accommodates the movable part of the seat, such that the rear wall (12) is disposed behind the movable part as shown in FIG. 1.

Each of the outer side walls (14) is fitted with an armrest (26), and the juxtaposed inner side walls (16) of the two housings are joined by a centre amenities armrest (27). Each side wall (14,16) is shaped towards it lower end to define a front leg portion (17). A thin, rigid plate (28) which may be made from extruded aluminium, light steel or a structural composite material extends between the two front leg portions (17) as shown in FIG. 3, and is drilled (not shown) for fixing the housing (10) in position. Passenger seats for use on aircraft are usually secured to spaced, parallel seat tracks provided in a floor of a passenger cabin of the aircraft, and where the seat unit of the present invention is intended for use as an aircraft passenger seat therefore, the plate (28) may be equipped with suitable fixings to seat tracks. Seat fixing of the kind disclosed in copending UK patent application no. 9803122.2, the contents of which are incorporated herein by reference, are preferred.

For additional support, the housing (10) is further provided with two spaced rear leg portions (30), and a second plate (32) is carried by the rear leg portions (30) to provide additional rigidity and attachment points to the seat tracks. A carpet (C) will usually be laid on the vehicle floor, and this abuts the first-mentioned and second plates (28,32). Plate 32 is protected from wear and damage by a plastic decorative cover.

The seat unit of FIGS. 1 and 2 thus comprises two adjacent passenger placements. It is also envisaged that individual seats comprising single passenger placements may be provided in accordance with the invention, and for convenience the operation of the seat of the invention is further described with reference to the single seat shown in FIGS. 4 to 11.

Figure 4:
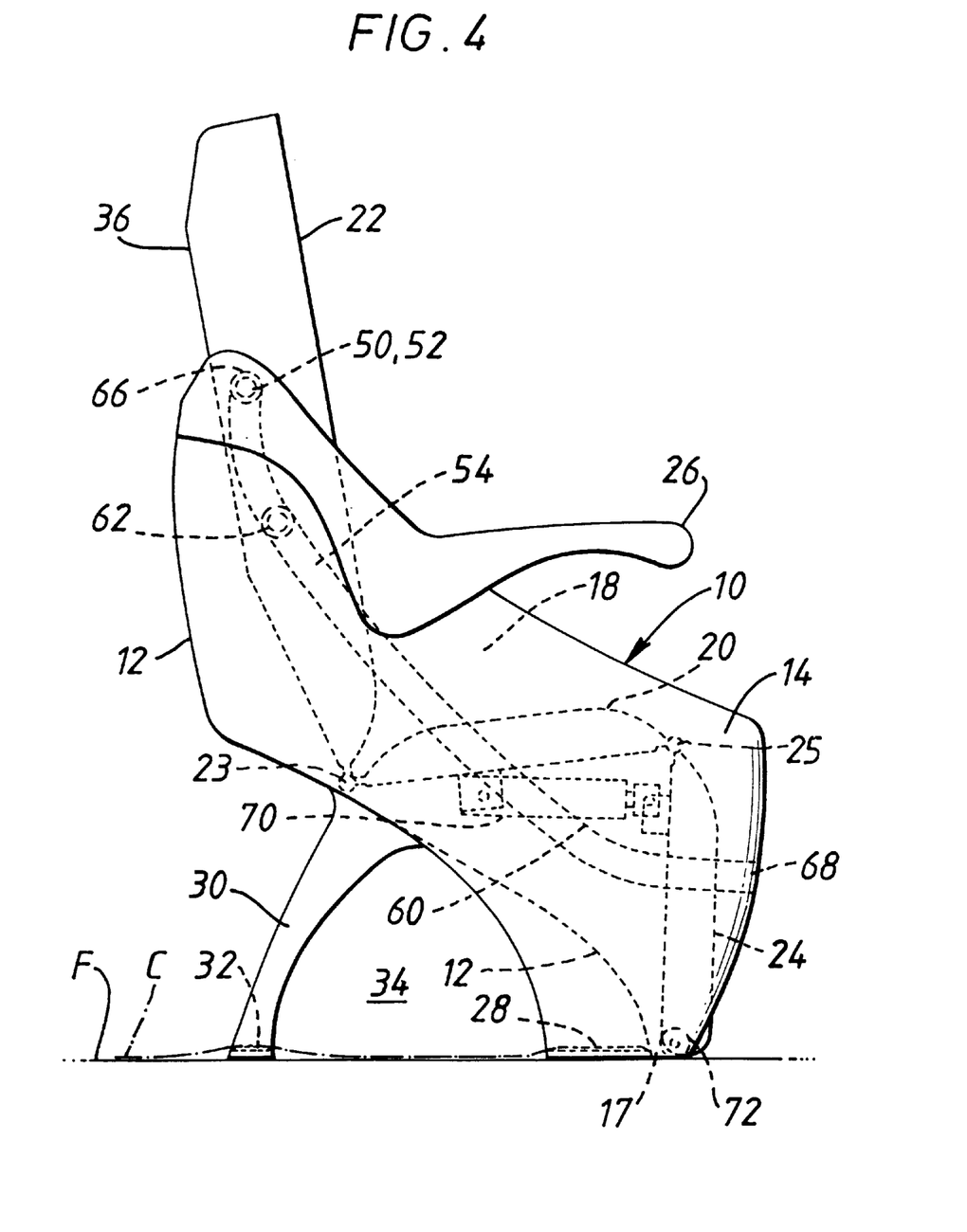
FIG. 4 is a side view of a single seat in accordance with the present invention, which seat is disposed in an upright position.

As seen in side view in FIG. 4, the rear wall (12) extends generally vertically behind the back-rest (22) of the movable part of the seat, and extends downwardly and forwardly under the seat pan (20) to meet the floor (F) forwardly of the first plate (28). Said rear wall (12) with the front and rear leg portions (17,30) thus defines a recess (34) beneath the back-rest (22) of the seat pan (20), which recess constitutes a foot-well for a person behind the seat.

Said back-rest (22), on its rear surface (36), carries a locking drive unit (38) (see FIGS. 5 and 6), which locking drive unit comprises an electric motor (40), having an output that is coupled through a gear box (42) to two, coaxial drive shafts (44). Each drive shaft (44) extends substantially horizontally between the gear box (42) and a respective side (46) of the back-rest (22). Each drive shaft (44) is journalled in a rotational bearing (48) which is mounted on the back of the back-rest (22) juxtaposed said respective side (46). The drive shaft (44) protrudes beyond the side (46) of the back-rest (22) and carries a roller bearing (50) and a pinion (52) that is keyed onto the end of the drive shaft.

Figure 6:
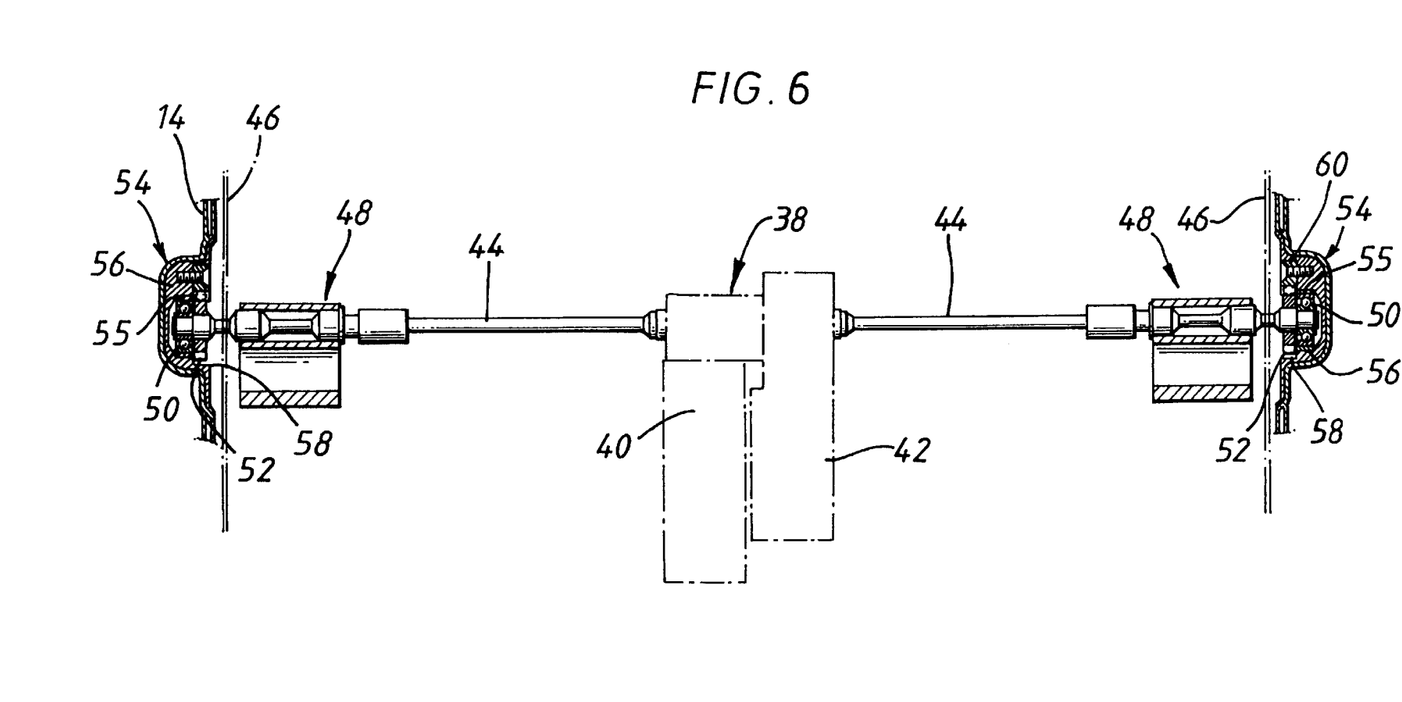
FIG. 6 is a rear elevation, partly in cross-section along the lines VI—VI of FIG. 5, of the drive mechanism for driving the seat within the housing.
Figure 6A:
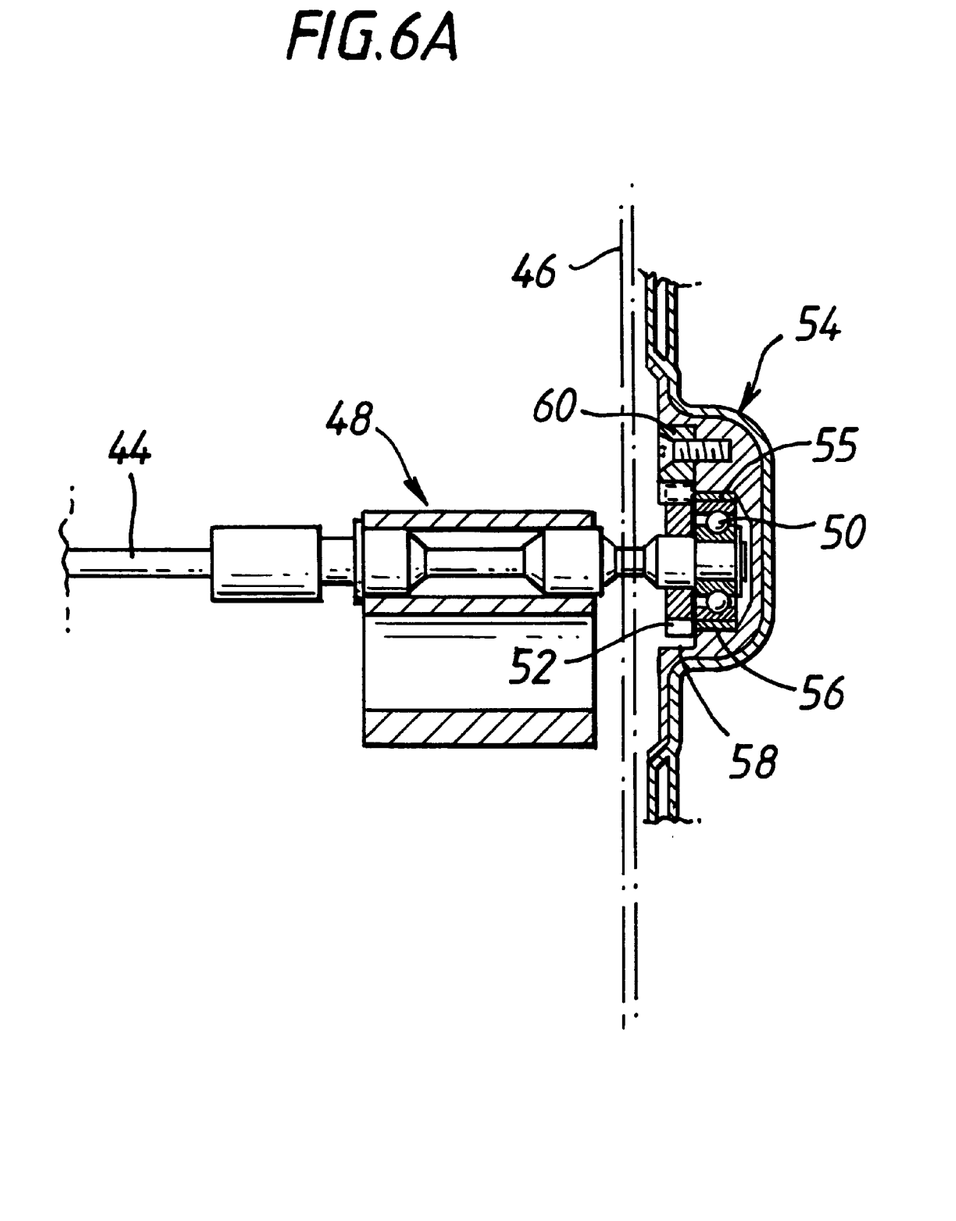
FIG. 6A shows a detail of part of the drive mechanism of FIG. 6.
Figure 7:
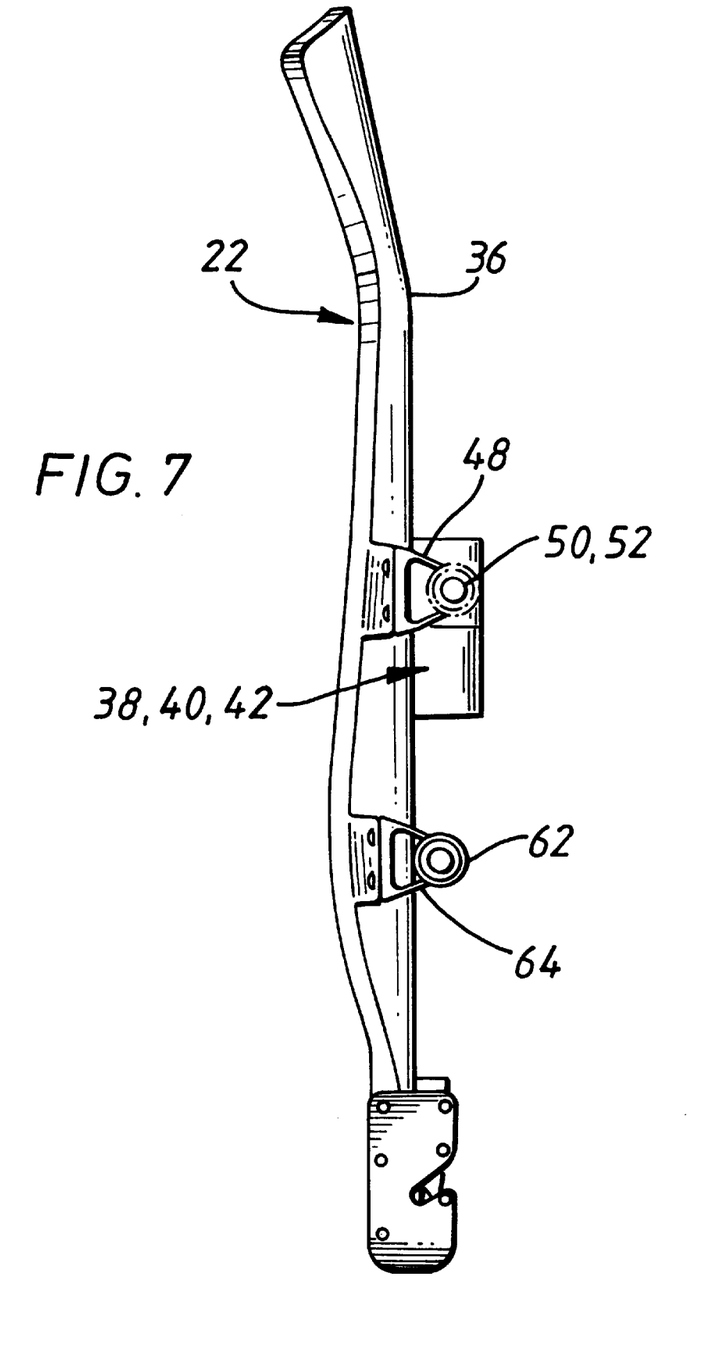
FIG. 7 is a side elevation of the back-rest of FIG. 5.
Figure 8:
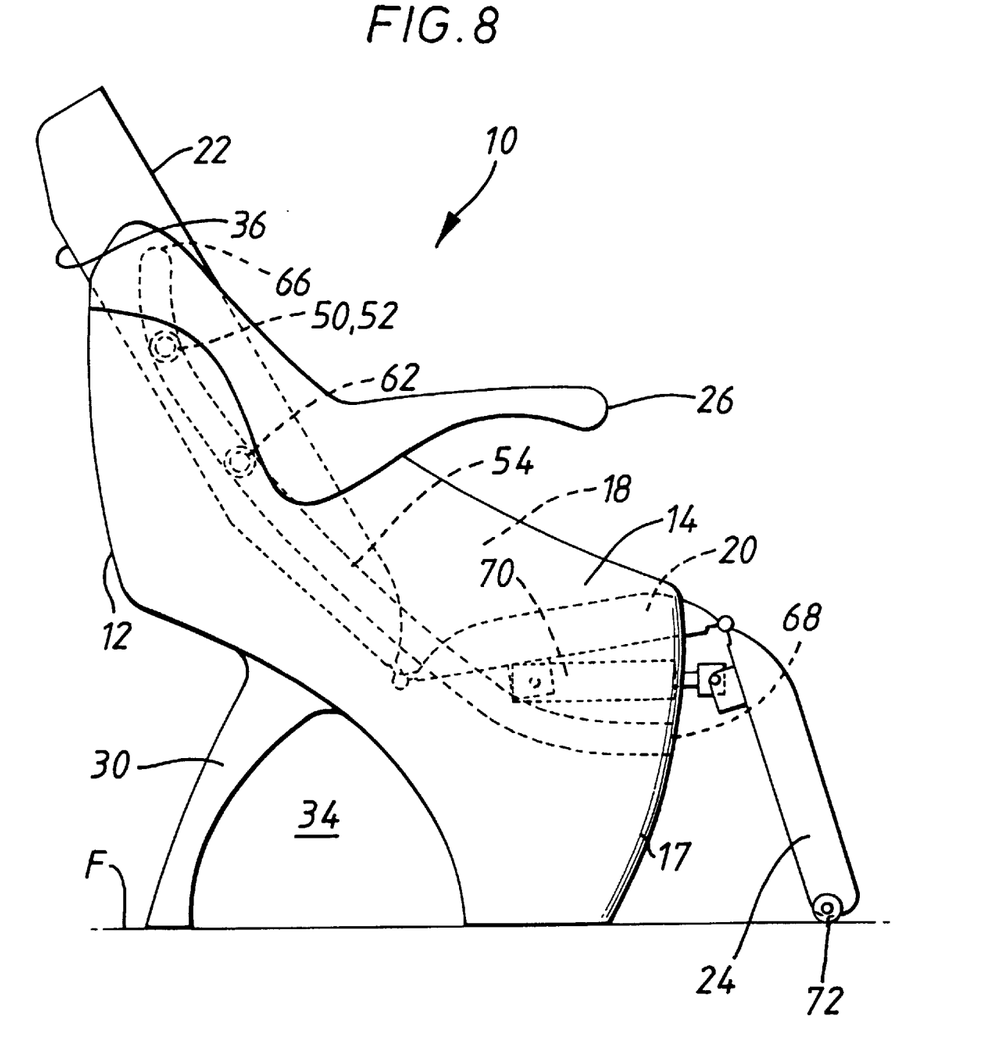
FIG. 8 is a side view of the seat of FIG. 4, shown in a first reclined position.
Figure 9:
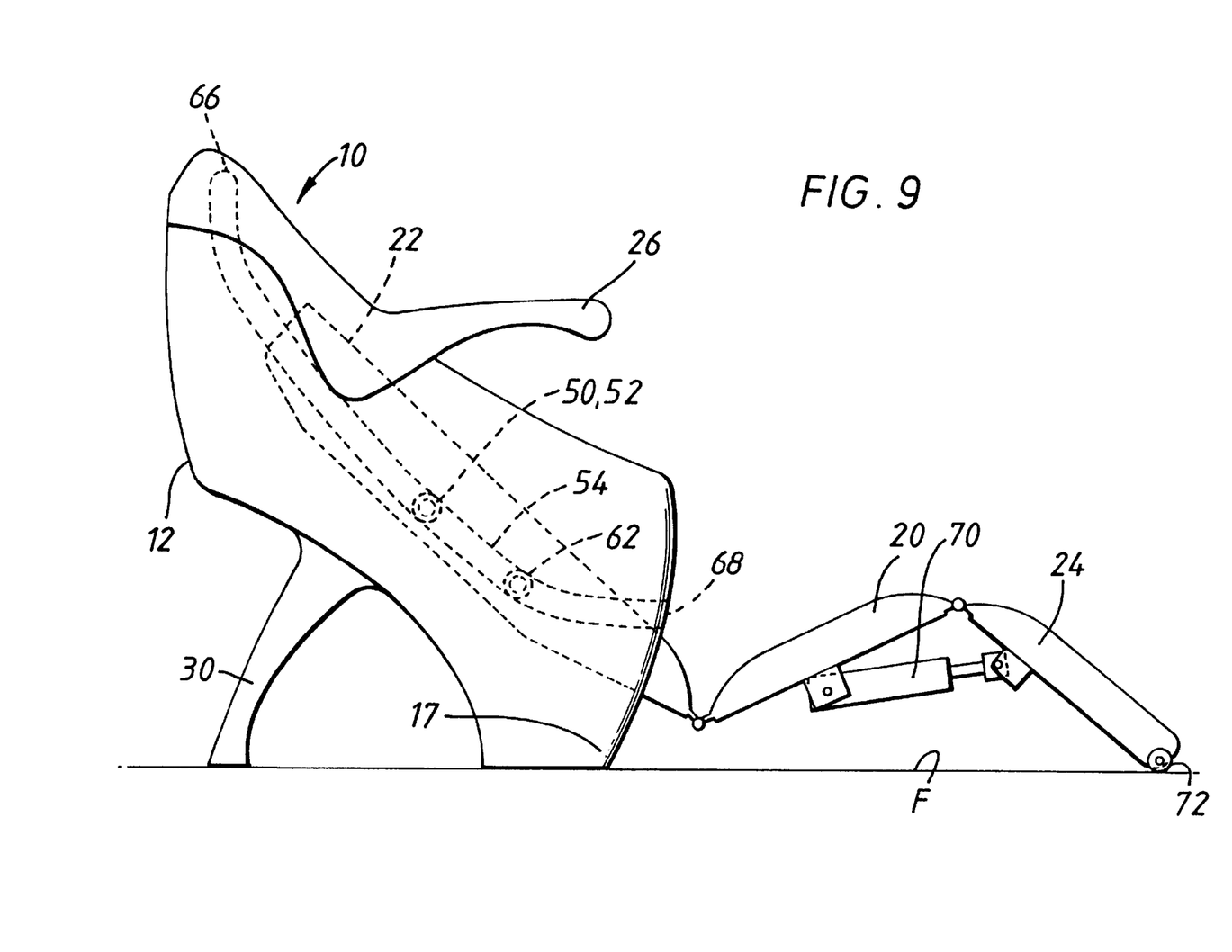
FIG. 9 is a side view of the seat in FIG. 4 shown in a second reclined position.

Said pinion (52) and roller bearing (50) on each drive shaft (44) are accommodated in a track (54) formed in the adjacent side wall (14,16) of the housing (10). Said track (54) is formed as a channel which is defined by two opposing surfaces (55) and, in cross-section as shown in FIG. 6, has a relatively narrow inner portion (56) that accommodates the roller (50), and a relatively wider outer mouth portion (58) that accommodates the pinion (52), which roller bearing (50) engages one surface (55) of the inner portion (56). One surface of the outer portion (58) is fitted with an elongate rack (60), which rack is engaged by the pinion (52). Operation of the motor (40) thus causes rotation of the two drive shafts (44) and pinions (52), and the inter-engagement of the pinions (52) with the racks (60) causes translational movement of the pinions along the racks, thus resulting in movement of the movable part of the seat relative to the housing (10).

Said gear box (42) can be controlled, so as to reverse the direction in which the drive shafts (44) are driven. Accordingly, the movable part of the seat can be driven in either direction along the tracks (54). Passenger-operable controls for the drive unit (38) may be provided at a convenient location on the seat, and in this connection it is envisaged that such controls will usually mounted in the arm-rest portions (26) or the central amenities arm-rest (27). By operating the controls, a passenger using the seat can move the movable part to any selected position along the track (54), and once the selected position has been reached, the drive unit will be self-locking so as to prevent free rotation of the drive shafts (44) and concomitant, unwanted movement of the movable part of the seat.

Figure 5:
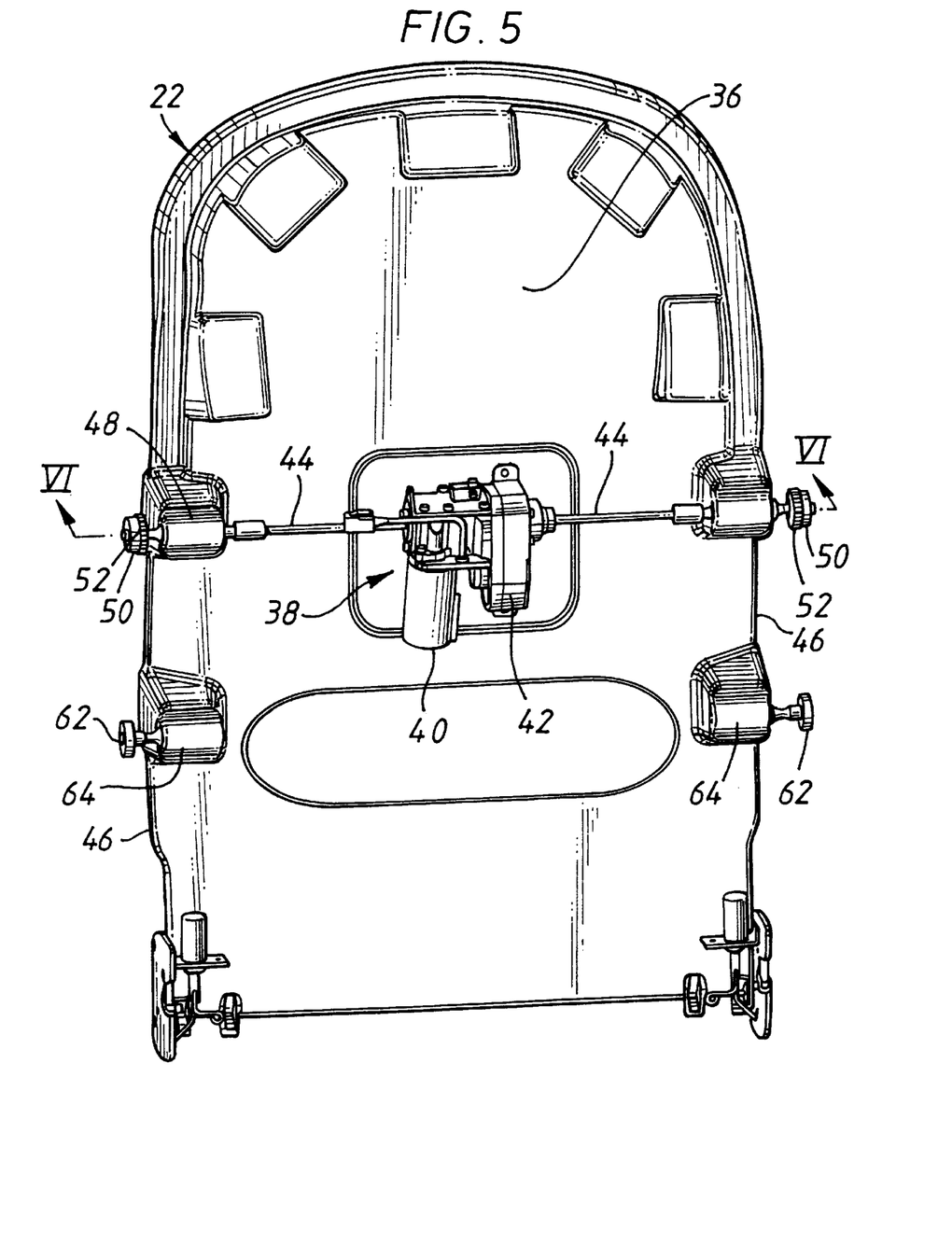
FIG. 5 is an isometric view from behind of the back-rest of the seat of FIG. 4, shown separated from the rest of the seat.

Each of said tracks (54) also accommodates a guide roller (62) that is journalled in a bearing (64) mounted on the back of the back-rest (22) at a point spaced from the roller bearing (50) and pinion (52) accommodated in the same track (54). The two guide rollers (62) are preferably mounted coaxially with one another as shown in FIG. 5, and each guide roller (62) engages one surface (55) of the inner portion (56) of the respective track (54), and thus serves positively to locate the back-rest at a second point in the track (54). It will be appreciated therefore that the orientation of the back-rest will be defined by the positions of the first-mentioned roller bearings (50) and the guide rollers (62), and these positions in turn will be defined by the configuration of the tracks (54).

Figure 10:
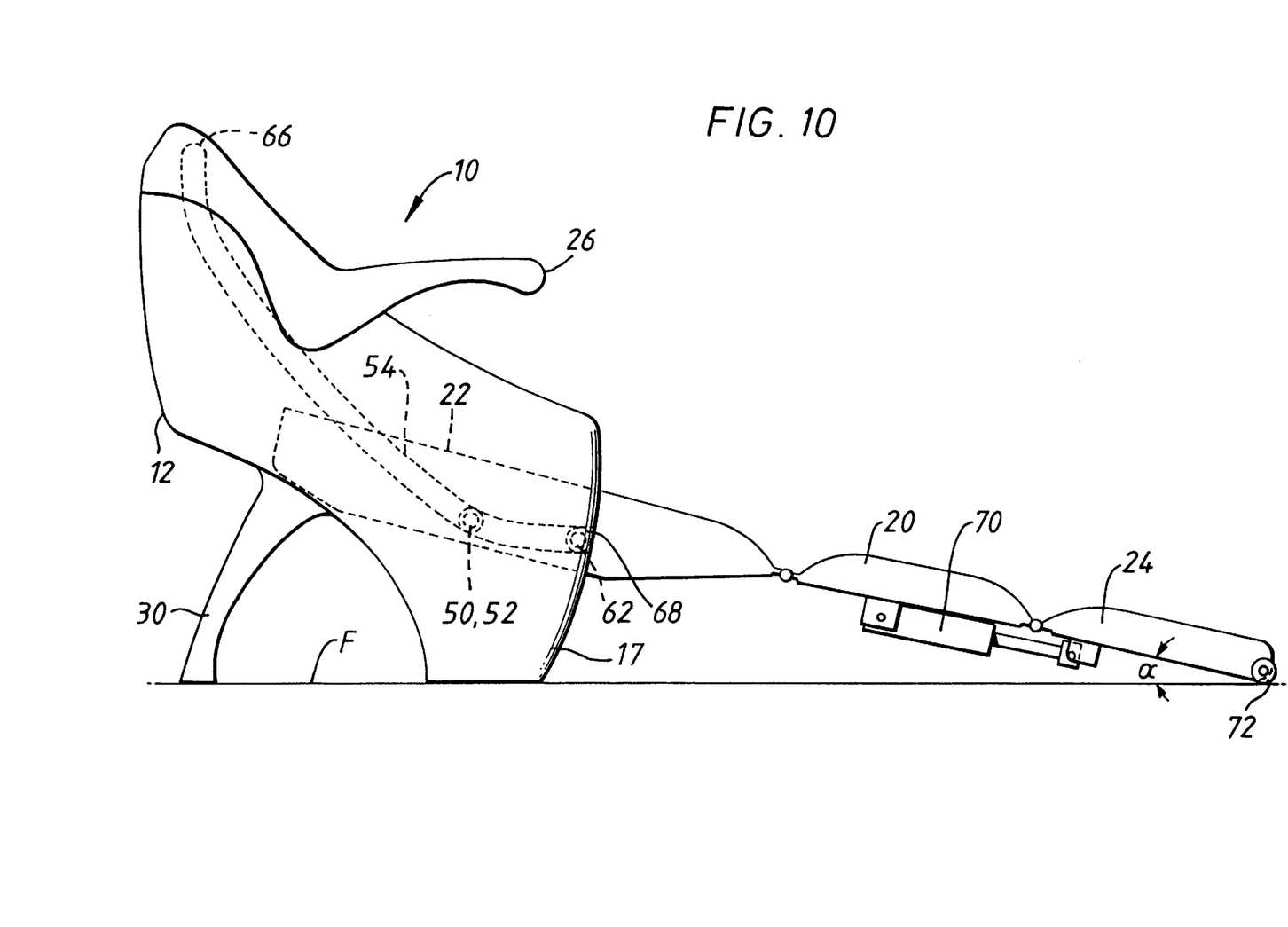
FIG. 10 is a side view of the seat in FIG. 4 shown in a fully reclined position.

Said tracks (54) are configured identically to one another and, as will be seen from FIG. 4, are shaped so that as the pinions (52) are moved from a first upper end (66) towards a second lower end (68), the back-rest (22) is moved from an upright position as shown in FIG. 4 to a fully reclined position as shown in FIG. 10, through one or more pre-selected, intermediate reclined positions. The seat illustrated in the figures is designed, so that the back-rest (22) passes through two such intermediate positions shown respectively in FIGS. 8 and 9. The configuration of the tracks (54) can thus be calculated by determining the required relative positions of the roller bearings (52) and guide rollers (62) at the upright, intermediate and fully reclined positions, and between these pre-selected positions, the locii of the tracks (54) is calculated by interpolation.

Said seat pan (20) is hinged on the back-rest (22) and leg-rest (24) by hinges (23) and (25) respectively, and a locking screw-drive mechanism (70) is connected between an underside of the seat pan (20) and an under side of the leg-rest (24). Said locking screw-drive mechanism (70) is used to control the angle subtended by the seat pan (20) and leg-rest (24), and is connected to a control device (not shown) for controlling the operation of the locking screw-drive mechanism (70) in response to the position of the movable part along the tracks (54). Whilst many ways of achieving this control will be readily apparent to a person skilled in the art, in the embodiment shown the control device comprises a microprocessor that receives input from a detecting device (such as a potentiometer linked to the electric motor (40)) for detecting the position of the pinions (52) along the tracks (54), and a memory device for storing the desired positions of the locking screw-drive mechanism (70) for each positions of the pinions (52), the output of the microprocessor being used to control the operation of the locking screw-drive mechanism (70). Said locking screw-drive mechanism (70) operates to adjust the angle subtended by the seat pan (20) and leg-rest (24) in response to the output of the controlling device and, at each selected position, to hold the seat pan (20) arid leg-rest (24) securely in that position.

Figure 12:
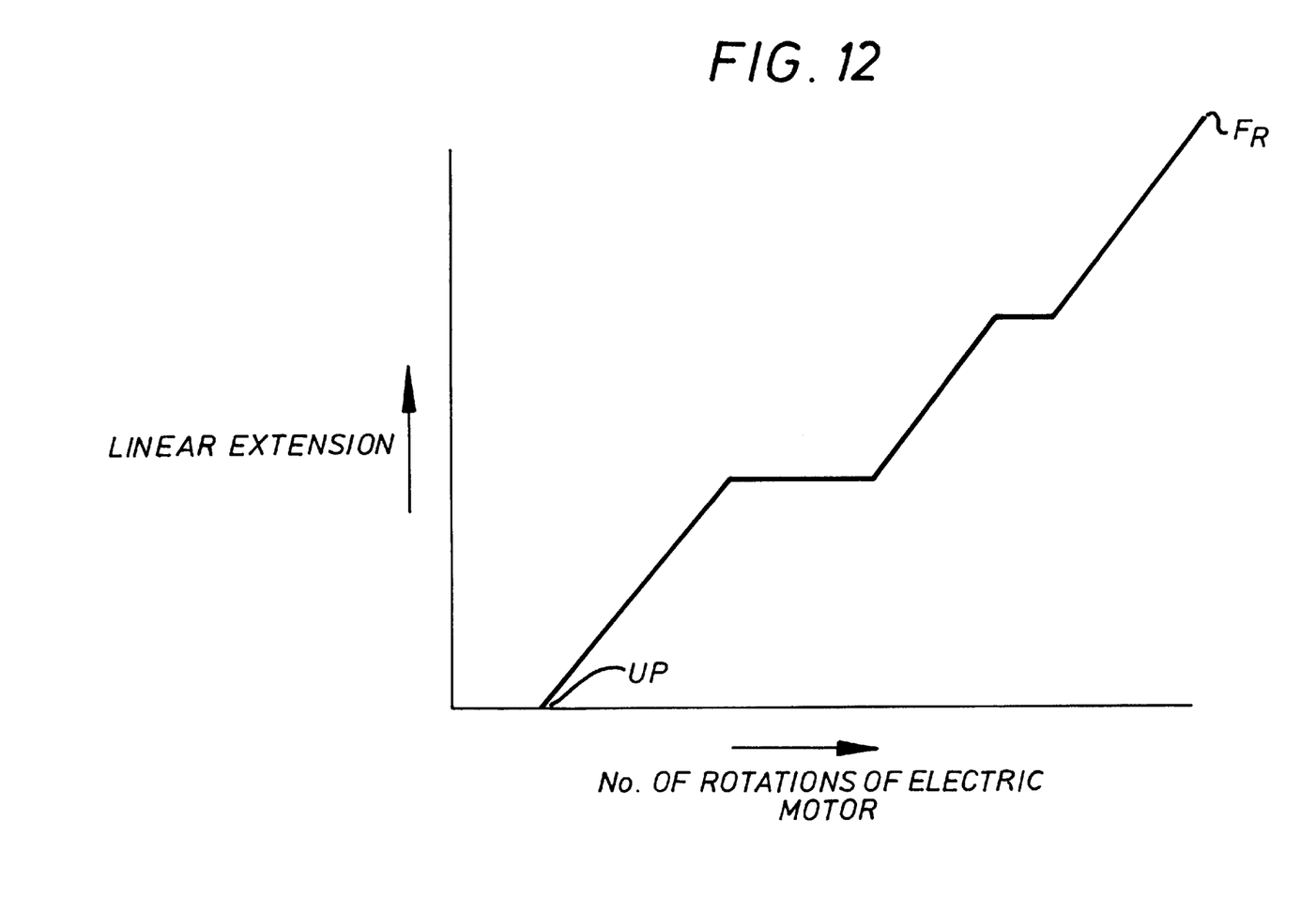
FIG. 12 is a graph of the linear extension of the locking screw-drive between the seat pan and leg-rest of the seat of FIG. 4 versus the number of rotations of the electric motor for driving the back-rest.

FIG. 12 shows a graph of the linear extension of the locking screw-drive mechanism (70) in relation to the number of revolutions of the electric motor (40) from the upright position (UP) to the fully reclined position (FR). It will be seen that in this presently preferred embodiment, the operation of the locking screw-drive mechanism (70) comprises three positions where the mechanism remains stationary for a small, predetermined number of rotations of the electric motor, and that intermediate these positions the speed of the mechanism (70) is approximately constant.

Said leg-rest (24) extends downwardly from the seat pan (20), and is fitted at its lower end with a full width roller (72) that engages the floor (F) of the vehicle. It will be appreciated that as the seat pan (20) is able to pivot freely with respect to the back-rest (20), the weight of the seat pan (20), leg-rest (24) (and a passenger when the seat is in use) will hold the leg-rest (24) in engagement with the floor (F), and the leg-rest (24) thus serves to support a substantial part of the weight of the movable part of the seat and passenger.

It will also be appreciated that the locking screw-drive mechanism (70) can be used to control the orientations of the seat pan (20) and leg-rest (24) relative to the back-rest (22) for any given position of the pinions (52) along the tracks (54). As the pinions (52) are driven along the tracks, the back-rest (22) is moved progressively, translationally downwards and forwards as described above. If the locking screw-drive mechanism (70) remains fixed, then this downwards and forwards movement of the back-rest (22) will cause concomitant forward movement of the seat pan (20) and leg-rest (24), and will also cause the seat pan (20) to tilt rearwardly with respect to the back-rest (22), so as to reduce the angle subtended by the upper surfaces of the back-rest (22) and seat pan (20). On the other hand, if the locking screw-drive mechanism is extended, then the angle subtended by the under-sides of the seat pan (20) and leg-rest (24) is increased, which has the effect of lowering the leg-rest (24) from an upright position as shown in FIG. 4 towards an extended position as shown in FIG. 10, and causing the seat pan (20) to tilt forwards. Thus by carefully designing the configuration of the tracks (54), and controlling the operation of the locking screw-drive mechanism (70), the orientations of the seat pan (20) and leg-rest (24) at each of the preselected positions of the back-rest (22) can be chosen, and again, intermediate these positions, the orientations of the seat pan (20) and leg-rest (24) can be determined by interpolation. Preferably, in each of the preselected, upright, intermediate reclined and fully reclined positions as shown respectively in FIGS. 4, 8, 9 and 10 of the drawings, the back-rest (22), seat pan (20) and leg-rest (24) define pre-selected, ergonomically comfortable positions for a passenger using the seat. In the seat illustrated in the drawings, the seat pan (20), back-rest (22) and leg-rest (24), are substantially coplanar with one another in the fully reclined position as shown in FIG. 10, so as to provide a substantially flat surface for a passenger to sleep on. Said substantially flat surface may subtend an angle of about 12° or 13° (angle α in FIG. 10) with the floor (F). As aircraft generally fly at a pitch of about 3°, of the actual inclination of the flat surface to the horizontal in flight will be about 9° to 10°.

Figure 11:
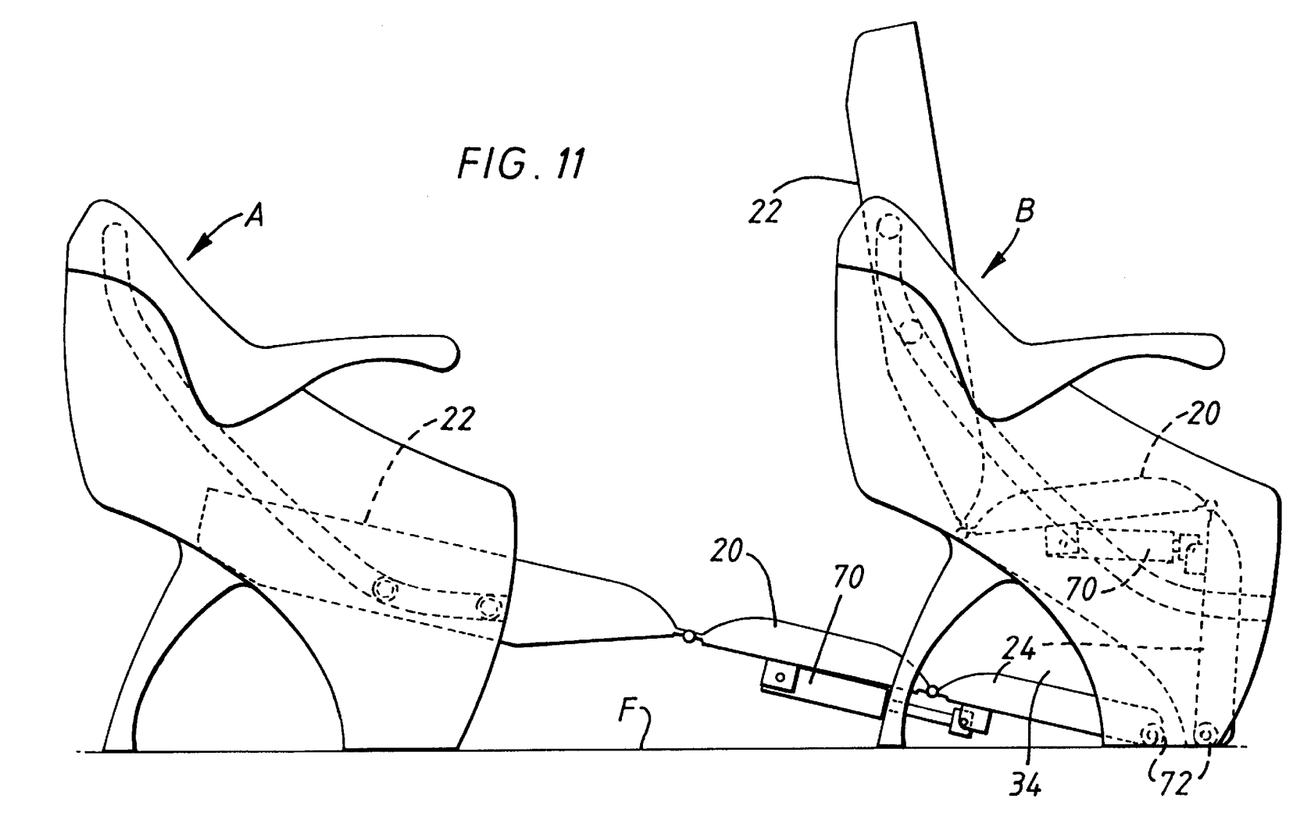
FIG. 11 is a side view of two single seats according to the invention, one positioned behind the other.

As shown in FIG. 11, seats in accordance with the present invention may be arranged in vehicle such that one seat (A) is located behind another (B), such that when the one seat (A) is moved to the fully reclined position as shown in FIG. 11, the leg-rest (24) extends into the foot-well space (34) defined by said other seat (B). As shown in FIG. 11, when the one seat (A) is moved to the fully reclined position, the lower end of its leg-rest (24) is disposed adjacent the lower end of the rear wall (12) of the other seat (B), thereby minimising the pitch between the seats (A,B).

It is envisaged that seats in accordance with the present invention will usually be manufactured as seat units, each seat unit comprising two seats side-by-side as shown in FIGS. 1 and 2.

An advantage of the seat as hereinbefore described is that it can be manufactured with a light-weight, relatively uncomplicated manufacture, and does not require the use of trolleys or the like for supporting the seat pan and leg-rest off the floor. In the fully reclined position, the leg-rest is positioned in juxtaposition with the floor, which enables full use to be made of the foot-well of a seat in front of the one that is reclined.

Furthermore, as the seat pan is supported by the leg-rest, the only "dead-space" occupied by the seat in the upright position is the thickness of the rear wall (12) and the leg-rest (24) of the seat, the reminder of the space, fore and aft of the rear wall (12) and leg-rest (24) can be used respectively by a passenger using the seat, and a passenger using the seat behind.

Positioning the drive unit for the movable part of the seat on the back of the back-rest (22) represents a convenient solution to the problem reducing the useful space that is occupied by such a drive unit, and moveover by positioning the drive unit on the back of the back-rest (22) the drive unit is spaced from the floor of the vehicle where dirt, dust and detritus are likely to collect.

What is claimed is:

1. A seat for a passenger vehicle, particularly an aircraft, which seat comprises a first fixed part for supporting the seat adjacent a floor of a vehicle; a second movable part comprising a seat pan component, a back-rest component and a leg-rest component; guiding means between the first fixed and second movable part for guiding movement of the movable parts relative to the fixed part between an upright position and a fully reclined position, such that as the movable part is moved towards the fully reclined position, said back-rest component is lowered translationally towards the floor; reclining means for reclining the back-rest component from an upright orientation to a fully reclined orientation as the movable portion is moved from the upright to the fully reclined positions; first pivot means for allowing the leg-rest component to be pivoted relative to the seat pan component between a raised position and a lowered position; and second pivot means for allowing the seat pan component to be pivoted relative to the back-rest component; characterised in that a locking drive means is associated with one of said first and second pivot means for pivoting relative to each other the components pivoted on said one pivot means, free pivoting is allowed of the components pivoted about the other pivot means and controlling means are provided for controlling the operation of the locking drive means according to the position of the movable part between the upright and the fully reclined positions; the arrangement being such that as the movable part is moved between the upright and fully reclined positions, the locking drive means is controlled such that the leg-rest component remains in contact with the vehicle floor.

2. A seat as claimed in claim 1, wherein the locking drive means acts between the seat pan and leg-rest components, and the back-rest and seat pan components are capable of freely pivoting relative to each other.

3. A seat as claimed in claim 1 wherein the guiding means, reclining and locking drive means are constructed and operated, so that as the movable part is moved between the upright and fully reclined positions, the back-rest, seat pan and leg-rest components are moved through one or more predetermined, ergonomically comfortable positions in succession.

4. A seat as claimed in claim 1 wherein the back-rest, leg-rest and seat pan components define a substantially flat surface for a passenger to sleep on, when the movable part is disposed in the fully reclined position.

5. A seat as claimed in claim 1 wherein said leg-rest component comprises a linear bearing for facilitating movement of the leg-rest component over the floor of the vehicle.

6. A seat as claimed in claim 1 wherein the locking drive means acts between the seat pan and leg-rest components, so that the leg-rest component can be used to support at least part of the weight of the movable part of the seat on the floor of the vehicle.

7. A seat as claimed in claim 1 wherein the locking drive means comprises a screw drive mechanism.

8. A seat as claimed in claim 1 wherein the leg-rest component is pivoted directly to the seat pan component, and the seat pan component is pivoted directly on the back-rest component.

9. A seat as claimed in claim 1, further comprising selectively operable driving means for driving the movable part progressively between the upright and fully reclined positions.

10. A seat as claimed in claim 1 wherein said guiding means comprising at least one elongate track that is provided on the fixed part of the seat, and a track following member provided on the back-rest component, which track following member engages the track for guiding the movable part between the upright and fully reclined positions.

11. A seat as claimed in claim 10 wherein the back-rest component is equipped with a second track following member which also engages the track, and is spaced from the first mentioned track member along the length of the track, and the track is configured, so that at each position of the movable part between the upright and fully reclined positions, the back-rest component is located relative to the track at two spaced locations, thus defining the recline angle of the back-rest component.

12. A seat as claimed in claim 9 wherein the selectively operable driving means comprises a motor that is mounted on the back of the back-rest component.

13. A seat as claimed in claim 1 wherein the controlling means comprises detecting means for detecting the position of the movable part between the upright and fully reclined positions, a memory for storing the desired position of the locking driving means for each position of the movable part and a micro-processor for operation of the locking driving means in response to input from the detecting means and the memory.

14. A seat as claimed in claim 1 wherein the fixed part comprises a shaped housing having a back wall and two opposing side walls.

15. A seat unit comprising two seats in accordance with claim 1.

* * * * *